March 19, 1940. Ö. RISZDORFER 2,194,152
PHOTOGRAPHIC CAMERA FITTED WITH AN ELECTRIC EXPOSURE METER
Filed Sept. 21, 1937 3 Sheets-Sheet 1

INVENTOR-
Ödön Riszdorfer
BY
Frank S. Appleman
ATTORNEY-

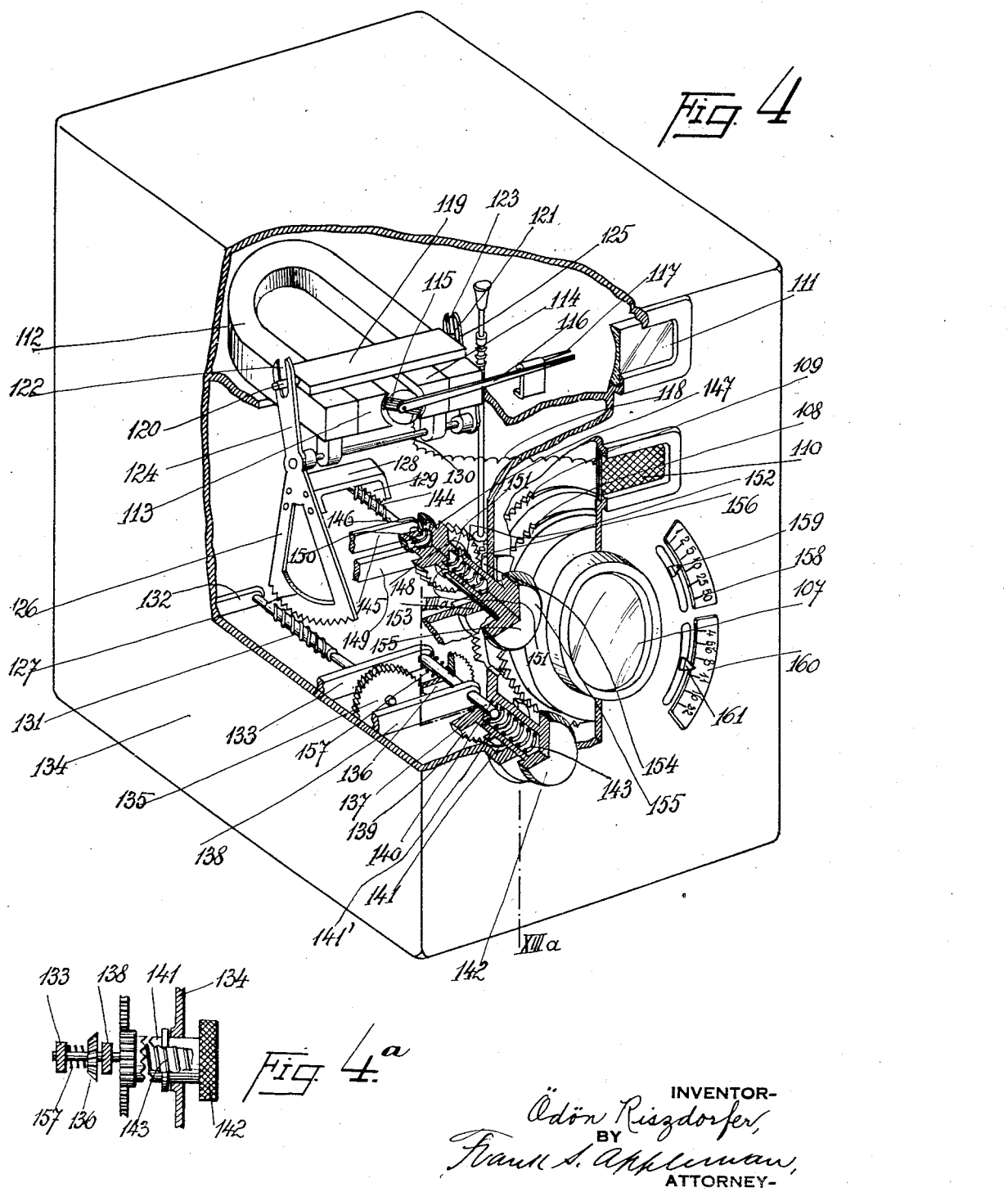

March 19, 1940.  Ö. RISZDORFER  2,194,152
PHOTOGRAPHIC CAMERA FITTED WITH AN ELECTRIC EXPOSURE METER
Filed Sept. 21, 1937    3 Sheets-Sheet 3
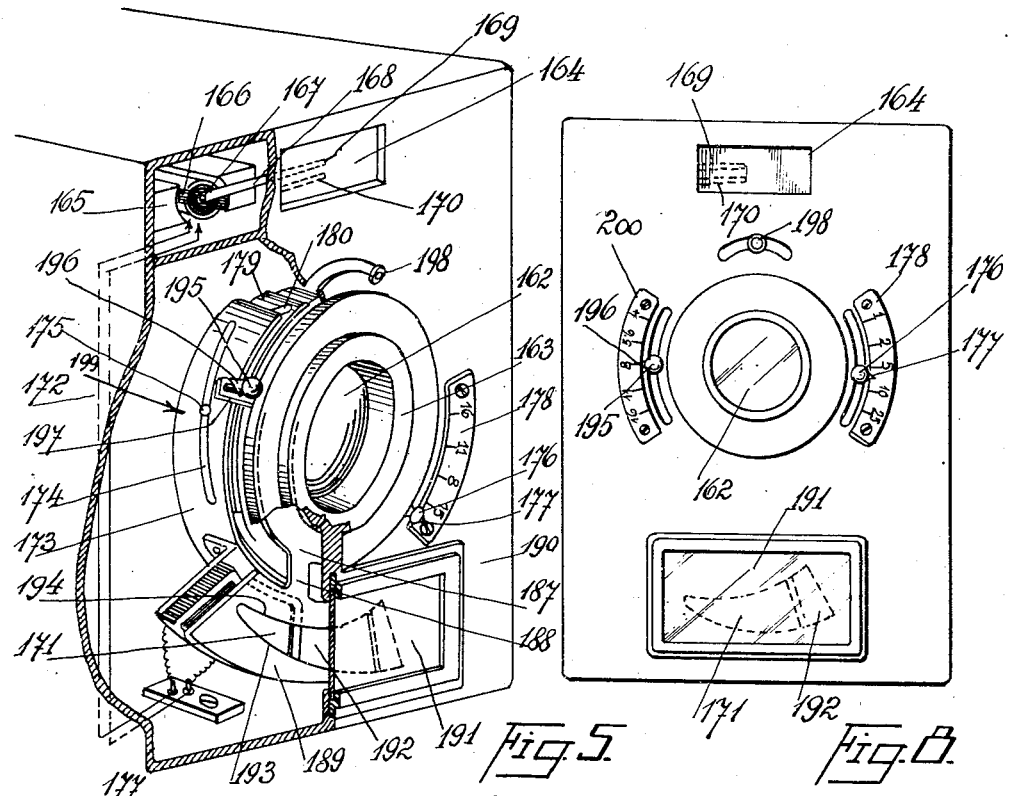
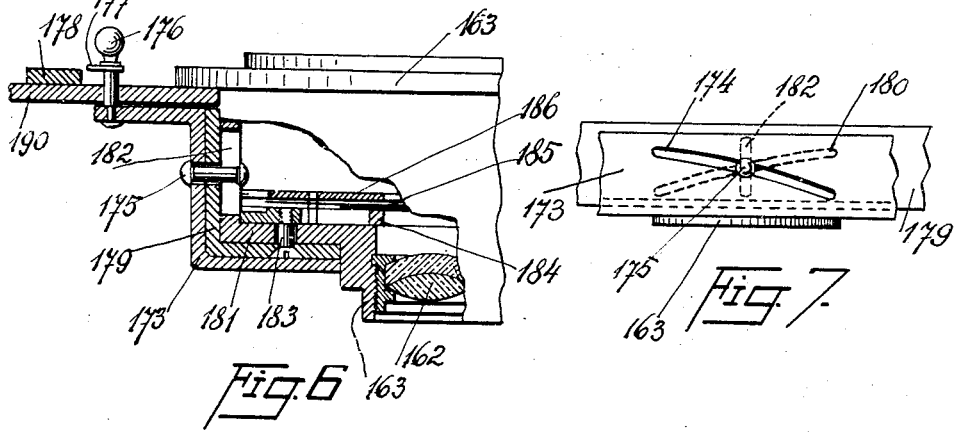
INVENTOR-
Ödön Riszdorfer,
BY
Frank S. Appleman
ATTORNEY- Patented Mar. 19, 1940

2,194,152

UNITED STATES PATENT OFFICE

2,194,152

PHOTOGRAPHIC CAMERA FITTED WITH AN ELECTRIC EXPOSURE METER

Ödön Riszdorfer, Budapest, Hungary

Application September 21, 1937, Serial No. 164,964
In Hungary September 23, 1936

5 Claims. (Cl. 95—10)

The invention relates to a photographic camera fitted with an electric exposure meter, in which the diaphragm or the speed control device of the shutter is coupled by electrical or optical means with the exposure meter in such a way that the exposure meter is influenced by the particular size to which the diaphragm opening has been set or by the particular figure to which the shutter speed has been set at any time. However, with a given illumination of the object to be photographed it is not only on the position of the diaphragm and on the shutter speed, that the correct exposure of the light sensitive layer depends but also on other factors, such as the degree of sensitivity of the emulsion, the density of any filter which may possibly be employed, and the like.

Certain specific embodiments of the invention contained herein were disclosed in my application Serial No. 693,204, filed October 11, 1933, which resulted in Patent No. 2,076,481 dated April 6, 1937, and in my pending application Serial No. 11,367, filed March 15, 1935; the present application is in part a continuation of the latter.

The purpose of the invention is to enable the elements determining correct exposure to be taken into account in a simple manner when taking the picture. All the constructional forms suggested in what follows are particularly suitable for photographic cameras fitted with an electric exposure meter, in which the correct setting, corresponding to the degree of illumination of the object to be photographed, of the diaphragm opening or of the diaphragm opening and of the shutter speed is indicated by the pointer of the electric exposure meter coinciding with a fixed or movable mark, in the manner described in the U. S. A. patent specification No. 2,000,037 dated May 7, 1935.

According to the invention, provision is made in the case of photographic cameras fitted with an electric exposure meter, the indication of which latter is influenced by the positions which the light control devices of the object lens of the photographic camera, diaphragm control device and shutter control device, occupy at any time, for the coupling in a manner permitting disconnection, of the setting mechanism of one of these light control devices with the diaphragm of the photo-cell.

Further, the invention covers a photographic camera fitted with electric exposure meter, in which the setting mechanism of one or both of the light control devices of the object lens of the photographic camera is mechanically coupled with a rotatably supported measuring instrument, that is to say with the carrying member of such instrument, so that by positioning one or both light control devices the position of the measuring instrument will be correspondingly altered.

Further, the invention covers a photographic camera fitted with an electric exposure meter, in which in the field of a magnetic measuring instrument a piece of iron influencing the field intensity is arranged in a movable manner and operated by a carrier coupled with the setting mechanism of one or both light control devices of the object lens of the photographic camera.

Finally, the invention covers a photographic camera fitted with an electric exposure meter, and with a diaphragm provided in front of a photo-cell, in which the photo-cell is connected with the setting mechanism of one of the light control devices of the object lens of the photographic camera and the slot diaphragm, arranged in a movable manner in front of the photo-cell, is controlled by means of the setting mechanism of the other light control device.

The invention will be better understood by reference to the accompanying drawings in which, Fig. 1 is a front elevation partly in section on the line X—X of Fig. 2 and showing the front part of a camera embodying one embodiment of the invention;

Fig. 4 is a perspective view of a modification of the invention and showing a camera with a portion of its casing broken away to show part of the interior;

Fig. 4a is a fragmentary view partly in elevation and partly in section, the view showing certain of the elements of the form shown in Fig. 4;

Fig. 5 is a fragmentary perspective of a camera embodying a third form of the invention, the camera casing being partly broken away to show the interior;

Fig. 6 is a view of the third form, the view being partly in plan and partly in section, radially through the lens and its mounting to show certain features of this form;

Fig. 7 is a fragmentary side view of this camera showing the lens mounting when viewed in the direction indicated by the arrow in Fig. 5;

Fig. 8 is a front elevation of the camera embodying the third form of the invention.

Figure 1:
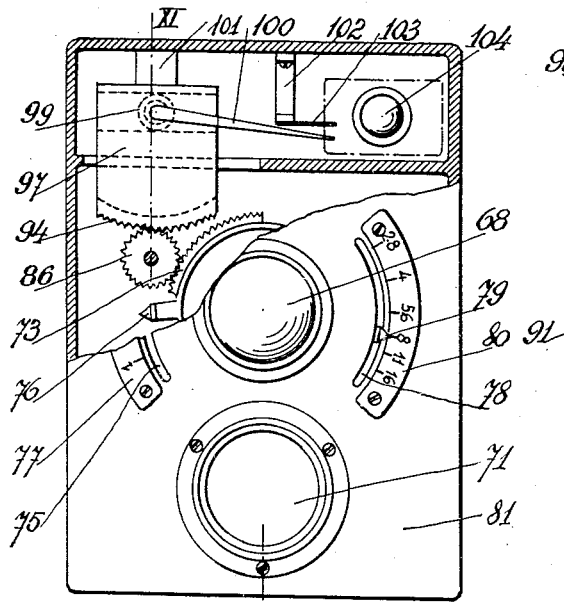
Figure 2:
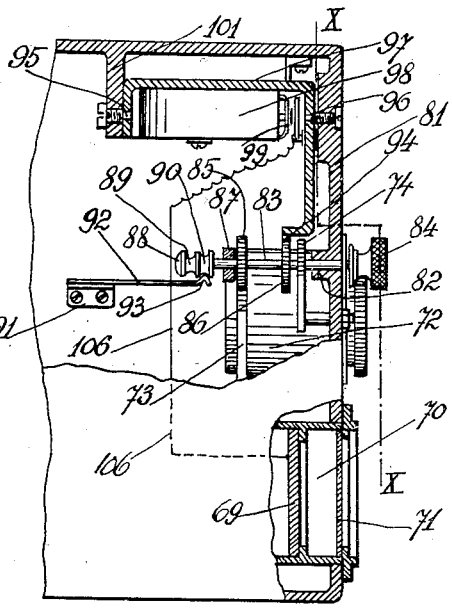
Fig. 2 is a fragmentary side view of this form of the invention partly in elevation and partly in section on the line XI—XI of Fig. 1.
Figure 3:
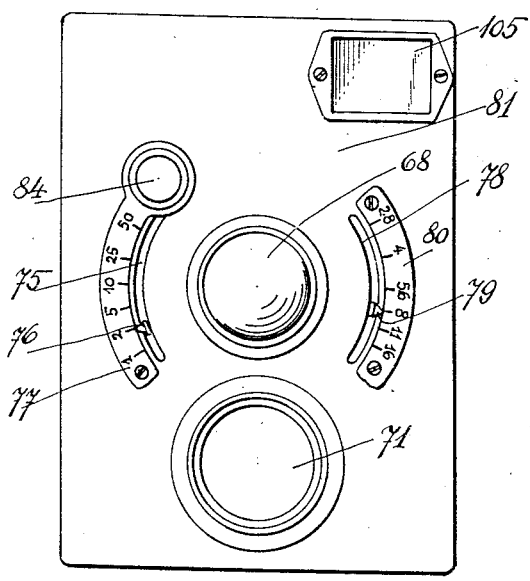
Fig. 3 is a front elevation of this form of the invention.

In the embodiment of the invention shown in Figs. 1, 2, and 3 the front wall 81 of a photographic camera is provided with an object lens 68. Below the optical equipment a photo-cell 69 is arranged in the apparatus, in front of which cell, however, no diaphragm is used in this case. The housing 70 of the photo-cell is closed at the front by means of a transparent glass pane 71.

On the mounting 72 of the optical equipment there are provided a toothed segment 73 connected with the speed control device of the shutter and a toothed segment 74 connected with the adjusting mechanism of the iris diaphragm. The segment 73 carries an index 76 sliding in the slot 75, adjacent which index the speed figures are indicated on the usual scale 77. The segment 74 is fitted with an index 79 sliding in the slot 78, adjacent which index the diaphragm figures are indicated on the usual scale 80. In the front wall 81 of the camera a shaft 83 is mounted to rotate in the bearing 82 as well as being movable in its axial direction in the said bearing. On its front end the axle carries a serrated button 84, whilst on its central part it carries two spaced gear-wheels 85 and 86 keyed on it in a fixed manner. The spacing of these gear-wheels is smaller than the spacing of the toothed segments 73, 74. The axle 83 has a second support in a bearing at 87, passes through this bearing and is fitted at its end with an extension piece 88. This extension piece is provided with two grooves 89 and 90 running around its whole circumference. The said grooves cooperate with the end of a spring 92 mounted in a fixed position at 91 on the camera casing, this cooperation taking place in such a manner that the bent-down end 93 of the spring 92 engages selectively in one or the other of the grooves 89 and 90.

The gear-wheel 86 engages with the tooth system of a toothed segment 94. The toothed segment 94 is formed on a bracket 97 supported in such a manner as to be capable of oscillation around the pivots 95 and 96, the said bracket carrying the complete measuring instrument. This measuring instrument is composed in the usual manner of the magnet 98, of the rotary coil 99, and of the pointer 100. The pivots 95 and 96 around which the link 97 oscillates are arranged in the front wall 81 of the camera casing and in an extension piece 101 of the same. The pointer 100 of the measuring instrument oscillates opposite to an index 103 fixed on the bracket 102. 104 is the ocular lens of a finder 105 of the usual type.

The apparatus operates in the following manner:

Before taking the photograph the serrated button 84 is pulled out to such an extent until the spring 93 will catch in the groove 89. When this is the case, the gear wheel 86 is in engagement with the toothed segment 74 of the diaphragm adjusting device. The desired extent of diaphragm opening is obtained by turning the button 84 and observing the index 79. At the same time, however, the gear-wheel 86 is also in engagement with the segment 94 and is, in accordance with the adjustment of the diaphragm, deflecting the bracket 97 and thus the whole measuring instrument. As soon as the diaphragm has been adjusted in this manner, the button 84 is pressed against the camera wall 81 until the spring 93 engages in the groove 90. When this has occurred the gear-wheel 85 will be in engagement with the tooth system of the shutter control device 73. As the tooth system 94 of the segment 97 possesses the necessary width, the gear wheel 86 which has been pushed out from the teeth of the segment 74 will continue to be in engagement with the segment 94. Now the button 84 is turned until the pointer 100 of the measuring instrument, which latter has been deflected with the bracket 97, coincides with the index 103. It will thus be seen that the index 103 is in the first place positioned by the current of the photo-cell led to the measuring instrument through the mains 106. Following this the position of the pointer is influenced by the adjustment of the diaphragm, as well as by the adjustment of the shutter control device. Coincidence between the pointer 100 and the index 103 indicates that both light control devices (the diaphragm and the shutter) are adjusted in a manner suiting the degree of illumination of the object to be photographed.

In the form of the invention shown in Figs. 4 and 4a the control of the diaphragm opening and of the shutter control device influence the position of the pointer of the measuring instrument in such a manner, that the adjustment of either of the said control devices will at the same time influence the field intensity between the magnet poles of the measuring instrument. In this form 107 is the object lens of the photographic camera, 108 the toothed segment of the adjusting mechanism of the object lens diaphragm, and 109 the toothed segment of the adjusting mechanism of the shutter control device. 110 is the photo-cell and 111 the front optical equipment of the finder. The measuring instrument includes the magnet 112 fitted with the poles 113 and 114 and with the rotary coil 115, this last-named coil actuating the pointer 116 to move with respect to the fixed index 117. The rotary coil 115 has one terminal connected in the usual manner, through the wire 118 to one terminal of the photo-cell and the other terminal of the rotary coil and the photo-cell are grounded to the metal of the camera casing. An armature of soft iron 119 extends across the poles of the magnet 112 and is supported so as to be capable of displacement longitudinally along said poles. The piece of soft iron 119 is provided at its ends with pins 120 and 121 which engage in the slots 122 and 123 of the levers 124 and 125, respectively, supported at the right and left of the magnet 112. The lever 124 is of the double-arm type and carries on its lower arm 126 a toothed segment 127. Both levers 124 and 125 are fixed on an axle 130 rotatably supported from the magnet 112. On the lever arm 126 an extension piece 128 is provided, which likewise carries a toothed segment 129. The toothed segment 127 of the lower lever arm 126 engages a worm 131 which is journalled rotatably in the brackets 132 and 133 of the camera casing 134 and carries a gear 135 on its front end. This gear 135 engages with a gear 136 which latter is fixedly keyed on the shaft 137 journalled in the brackets 133 and 138 and is urged forward by a spring 157 in such a manner that normally it does not engage with the gear 135. Accordingly, the gears 135, 136 form a coupling capable of being connected and disconnected. The shaft 137 also carries a gear wheel 139, which in its operative position cooperates with the toothed segment 108 of the diaphragm. On the gear wheel 139 there is mounted one member 140 of a clutch coupling, the second member 141 of the said coupling being formed on a rotatable button 142 and carrying a shoulder 141' engaging the front camera wall in case the coupling 140, 141 is open. A spring 143 tending to keep the claw coupling in the opened position is provided in the interior of the claw coupling. In Fig. 4 this coupling is represented in the closed condition.

The toothed segment 129 of the extension piece 128 meshes with the worm 144. This screw spindle is supported rotatably in the bracket 145 and carries on its front end one member 146 of a clutch coupling. The second member 147 of this coupling is mounted on a gear wheel 148 which gear wheel is journalled in the bracket 149. The coupling 146, 147 is normally kept in the open position, as shown on the drawing, by a spring 150. The front face of the gear wheel 148 carries another clutch member 151 of a clutch coupling, the second member 152 of the last mentioned coupling being formed on a hollow shaft which is limited in outward movement by means of a shoulder 154 engaging against the front camera wall 153 and carries on its front end projecting from the camera wall 153 a serrated button 155. The coupling 151, 152 is normally kept in the open condition as shown on the drawing, by a spring 156. The spring 156 is dimensioned so as to be of greater strength than the spring 150. When the coupling 151, 152 is closed, the gear wheel 148 cooperates with the toothed segment 109.

The method of operation of the apparatus is the following:

Before taking the picture, a certain shutter speed, for instance, is adjusted at will. This is effected by pressing the button 155, against the action of the springs 150 and 156, against the wall of the camera casing. As the spring 150 is dimensioned so as to be of less strength than the spring 156 it is first the coupling 146, 147 that is closed whilst during the further movement of the button on the force of the spring 156 is overcome and the coupling 151, 152 is closed. Upon closing of the coupling 146, 147, the gear-wheel 148 is displaced in the inward direction to an extent corresponding to the length of the engaging movement of the coupling 146, 147. The width of the teeth of the gear wheel 148, however, is so dimensioned that notwithstanding this displacement the gear wheel 148 and the toothed segment 109 remain in mutual engagement. In accordance with the extent in which the button 155 is now turned, the worm 144 turns likewise and in doing so actuates the segment 129 to cause the levers 124, 125 to rock on their pivotal axis, whereby the piece of iron 119 is correspondingly moved over the poles 113, 114. Accordingly, the field intensity between the magnet poles is influenced in an extent corresponding to the extent in which the button 155 has been turned i. e. in accordance with the adjustment of the shutter speed.

After the shutter speed has been adjusted, the operator releases the button 155, in consequence whereof the couplings 146, 147 and 151, 152 open. He now presses the button 142 against the front wall of the camera. As the spring 157 is of smaller strength than the spring 143 it is first the coupling consisting of the gears 135, 136 that is put in gear. Following this, the spring 143 is compressed and thereby the clutch coupling composed of the parts 140 and 141 is closed as shown on the drawings. In connection herewith the gear wheel 139 becomes displaced in an extent corresponding to the closing movement of the coupling 135, 136. The width of the teeth of the said gear wheel is, however, such that notwithstanding such displacement, engagement between the gear wheel 139 and the toothed segment 108 is maintained. Following this, the button 142 is turned toward the right or toward the left while looking at the same time through the finder 111. In the field of vision of the finder the pointer 116 and the fixed index 117 are visible. By turning the button 142 there is effected, through the worm 131 and the toothed segment 127, a deflection of the pair of levers 124, 125 and a displacement of the piece of iron 119, whereby the intensity of the magnetic field is influenced. The button 142 is turned towards the left or towards the right until coincidence between the indices 116 and 117 is obtained in the finder. Thereby the size of diaphragm opening corresponding to the shutter speed chosen and to the existing degree of illumination has been obtained.

The worms 131 and 144 are constructed with sufficient pitch as to assure that the worms should not be self-locking. This measure, as well as the employment of the couplings 135, 136 and 146, 147, is necessary in order to ensure that when setting one of the light control devices, for instance that of the diaphragm, the position of the other light control device should not be influenced. On the scale 158 the index 159 indicates the shutter speed obtained at any time, whilst on the scale 160 the index 161 indicates the figure of diaphragm opening obtained at any time.

In the form of the invention shown in Figs. 5–8, 162 is the object lens of the camera, arranged in the usual manner, in the mounting 163. 164 is the front lens of the finder. The measuring instrument of the exposure meter is mounted in the camera. This measuring instrument is composed in the usual manner of a magnet 165, of the oscillating coil 166 and of a shaft 167 for this coil. This shaft actuates the pointer 168 of the measuring instrument. The pointer 168 extends, at its end 169, into the field of vision of the finder where a fixed index 170 is provided. The photo-cell 171, the current of which is led to the measuring instrument through the mains 172, is fastened to an annulus 173, which annulus will be called a slide in what follows, and which is mounted coaxially with the optical axis of the object lens of the photographic camera, i. e. with the mounting of this object lens, for rotation around such mounting. In the slide 173 there is provided a guide slot 174 extending in an oblique direction relatively to the edge of the slide. A pin 175 engages at its upper end in this guide slot. On the slide 173 a small handle 176 is provided which carries an index 177 sliding along the diaphragm scale 178. This diaphragm scale, differently from what is the case with the usual kinds of diaphragm scales, has a linear division. Concentric to slide 173, a slide 179 of similar design is provided. In the slide 179 there is provided a slot 180 extending in an oblique direction, the said slot being arranged in such a manner that the two slots 174, 180 intersect at the place at which the pin 175 is situated at any time. The pin 175 is arranged in a slot 182 formed in a fixed part 181 of the mounting and extending parallel to the optical axis. In this slot the link block is able to travel to and fro. The slide 179 is connected in the usual manner through bolts 183 with the adjusting ring 184 of the diaphragm lamellae 185, 186 being the usual fixed ring of the diaphragm. 187 is the adjusting ring of the shutter control device and is connected through an extension piece 188 with a diaphragm 189 movable in front of the photo-cell 171. This diaphragm 189 moves behind a window 191 provided in the front camera wall 190. The diaphragm 189 possesses a cut-out opening 192 which latter has curved boundary lines 193 and 194 on two sides. The shutter ring 187 is actuated by means of the button 195 fitted with an index 196. The index 196 slides along the speed scale 200. The button 195 is mounted on a lever arm 197 connected with the ring 187. 198 is a button for winding up the spring mechanism of the shutter.

In the constructional form described, the photo-cell 171 is connected with the slide 173, which latter is positively coupled with the adjusting mechanism of the diaphragm. The diaphragm 189 of the photo-cell is connected with the adjusting ring of the speed control device of the shutter. The area of that part of the surface of the light sensitive layer of the photo-cell which is exposed to light at any time through the window 191 and through the cut-out opening 192 of the diaphragm 189 will necessarily be increased or diminished, respectively, in exact proportion to the extent in which the shutter speed is altered when adjusting the shutter control device or respectively to the extent in which the size of the diaphragm opening is altered when adjusting the diaphragm. The shutter control device of the usual kinds of photographic cameras possess a linear scale so that there is nothing to prevent the direct connection of the diaphragm 189 of the photo-cell with the adjusting ring of the control device, provided that the cut-out opening 192 of the diaphragm 189 has a correct shape i. e. such a shape as will ensure that when the diaphragm 189 is displaced relatively to the photo-cell 171 the area exposed to light of the photo-cell will vary in a linear manner. On the other hand the scales of the usual iris diaphragms are not fitted with linear divisions, as it is not in a linear manner, but according to an exponential function that the opening presented at any time by an iris diaphragm varies with the extent of the rotary deflection of the adjusting ring of the diaphragm lamellae. As differing from this, the diaphragm of the camera according to the present invention is, as appears from Fig. 5, fitted with a scale 178 having a linear division. This linear division is only possible if the two slides 173 and 179 are, as described and illustrated in the drawings, provided in the adjusting mechanism, the guide slots 174 and 180 being so arranged in the said slides as to ensure that to equal angular movements of the adjusting button 176 there should correspond equal alterations of the area of the light passage opening of the diaphragm. The extent of the obliquity of the guide slots 174, 180 depends on the particular design of the iris diaphragm in the given case and can only be determined in each case by empirical methods.

I claim:
1. In a photographic camera in which a predetermined reading of a photo-electric exposure meter indicates that the camera is set for proper exposure, a camera shutter, means for adjusting the exposure interval of the shutter, a camera diaphragm, means for adjusting the opening of the diaphragm, a photo-electric exposure meter for giving a reading, a device adjustable for altering the reading of said meter and means coupling said device for joint control by said shutter adjusting means and said diaphragm adjusting means.

2. A photographic camera having two independently adjustable members for altering the exposure setting, a light sensitive device including a photo-electric cell connected to an indicating meter, means movable with respect to said cell for governing the transmission of light to said cell, means coupled to one of said adjustable members for varying the position of said cell relatively to said movable means, and connecting means for actuating said movable means in accordance with the adjustment of the other of said adjustable members.

3. A camera as claimed in claim 2, in which the photo electric cell and the movable light transmitting means are mounted for arcuate movement about a common axis.

4. A photographic camera in which a predetermined reading of a light sensitive device including a photo electric cell indicates that the camera is set for proper exposure, a camera casing, a support for said cell mounted for movement in the camera casing, a window in the casing in front of said cell, a diaphragm comprising a vane provided with an elongated aperture tapering in width mounted for movement between the window and said cell, whereby movement of either said cell or said diaphragm relative to the other will vary the area of said cell exposed to light entering the casing through the window, and two independent exposure adjusting members connected with said cell support and with said diaphragm, respectively, whereby the area of said cell exposed to light is altered upon the adjustment of either of said members.

5. In a photographic camera in which correct exposure setting is indicated by a predetermined reading of a light sensitive device responsive jointly to two independently adjustable exposure controlling devices, said light sensitive device including an electric meter associated with an index for giving a reading, means for adjusting said meter with respect to the index, whereby the apparent reading is altered, said adjusting means having two operative positions in one of which it is operatively connected to one of said exposure controlling devices and in the other of which it is operatively connected to the other of said exposure controlling devices.

ÖDÖN RISZDORFER.